Figure 1:
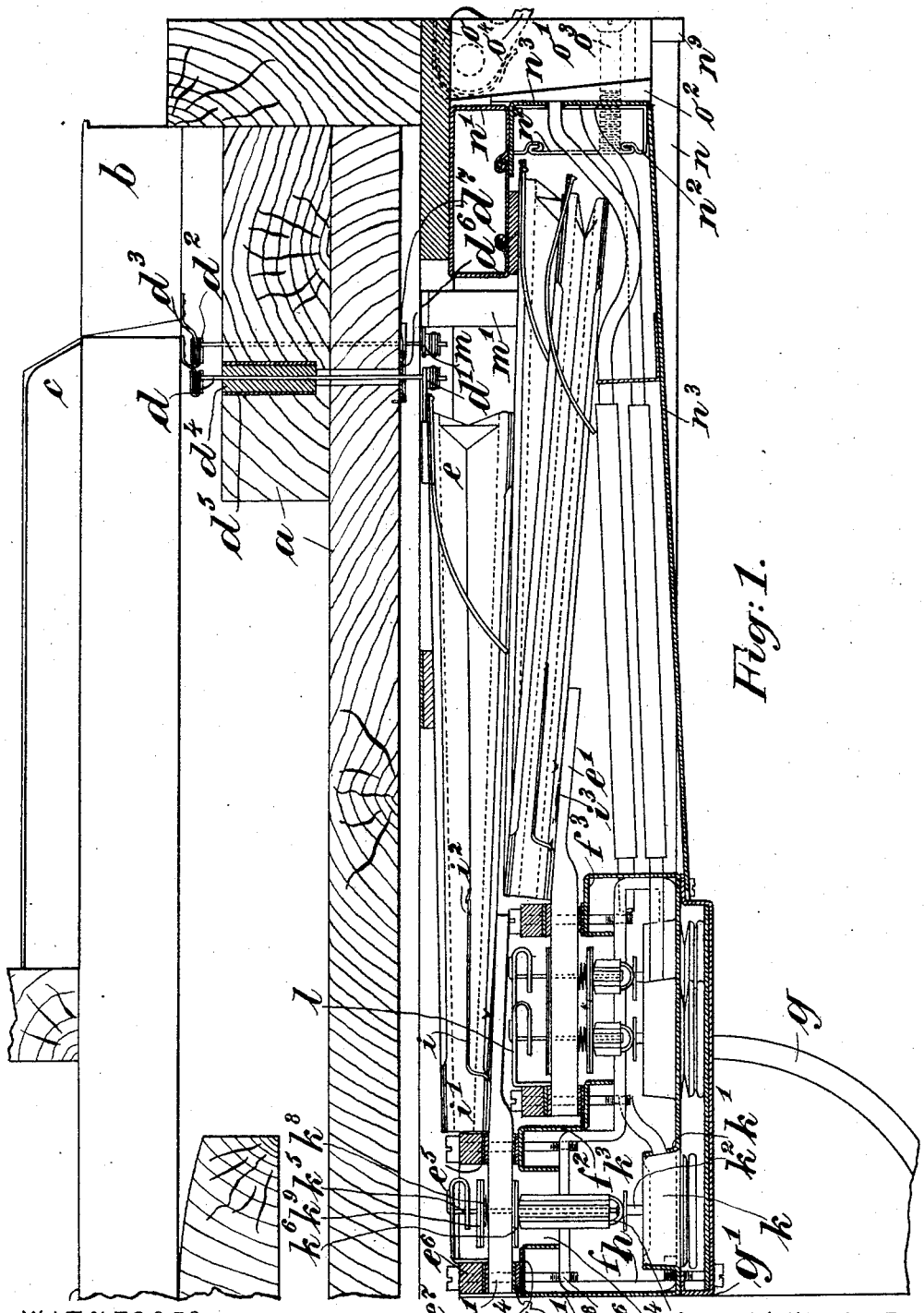

C. W. ATKINSON.
PIANO PLAYING MECHANISM AND THE LIKE.
APPLICATION FILED APR. 9, 1910.

1,046,369.

Patented Dec. 3, 1912.

5 SHEETS—SHEET 1.

WITNESSES
W. P. Burke
John A. Percival

INVENTOR
Claude William Atkinson.
By
ATT'Y

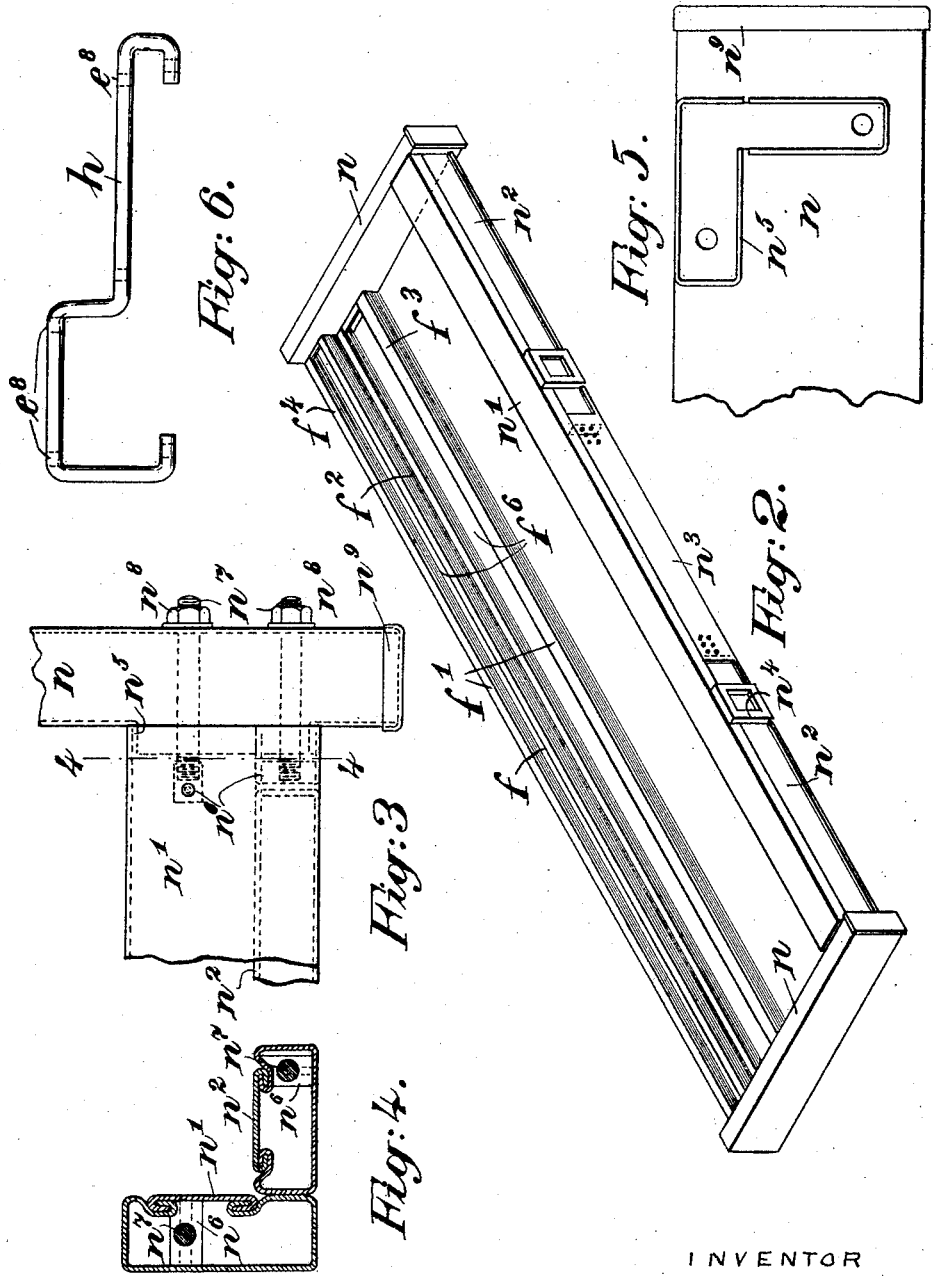

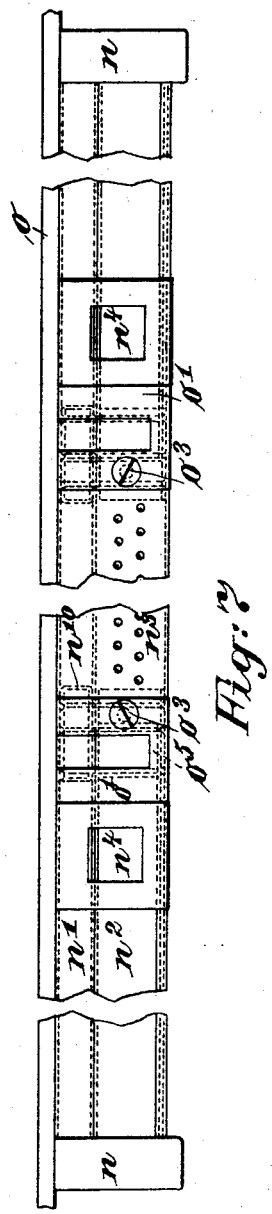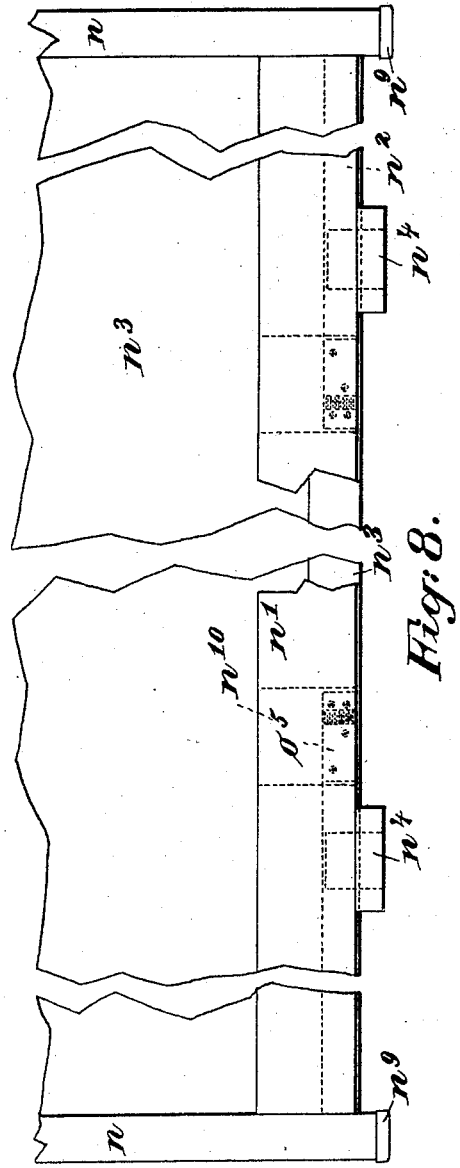

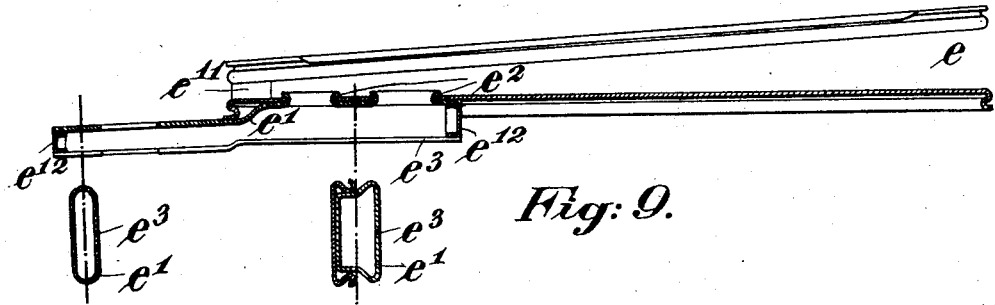
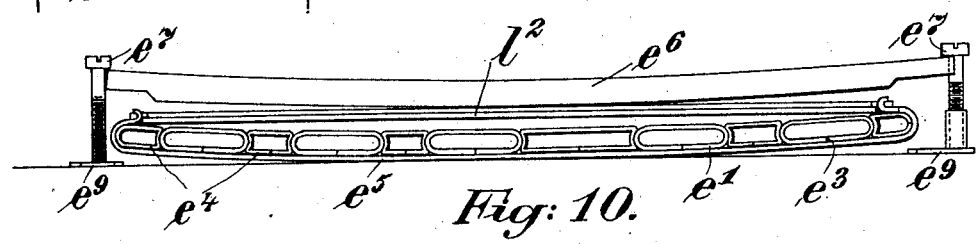
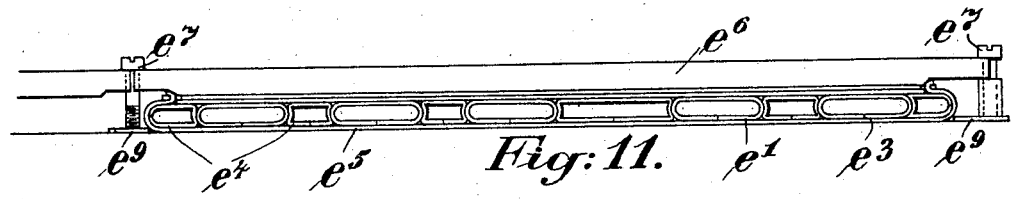
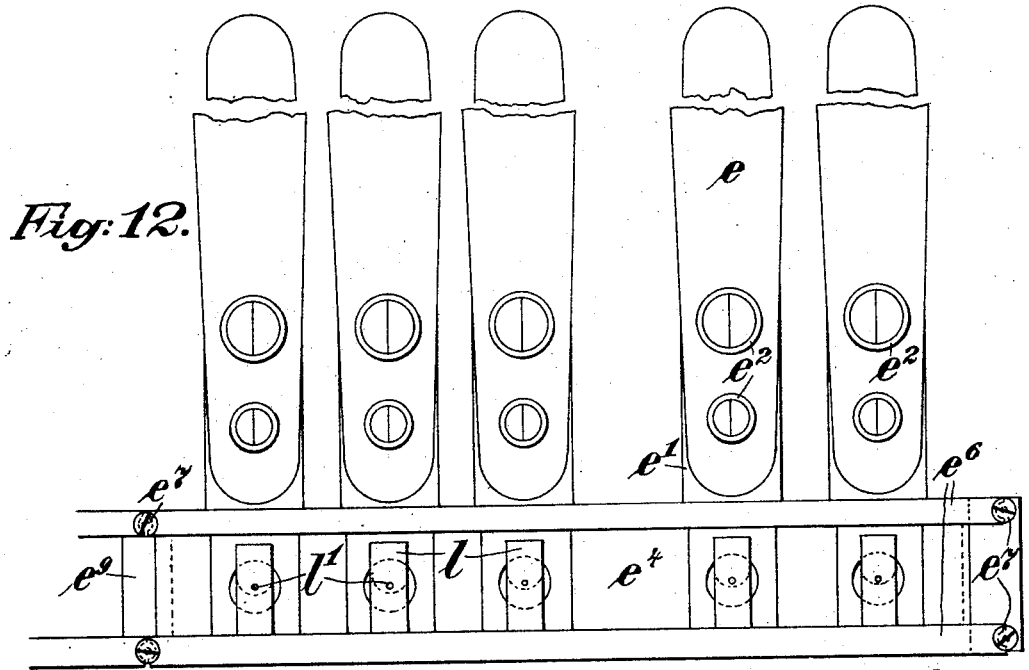

C. W. ATKINSON.
PIANO PLAYING MECHANISM AND THE LIKE.
APPLICATION FILED APR. 9, 1910.
1,046,369.
Patented Dec. 3, 1912.
5 SHEETS—SHEET 5.
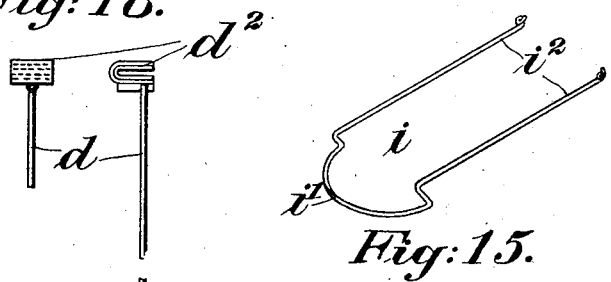
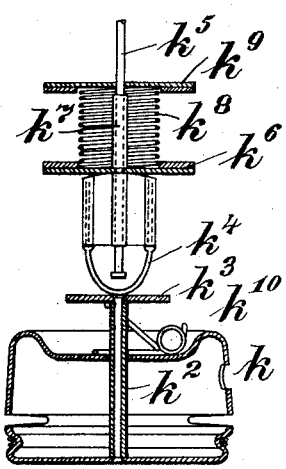
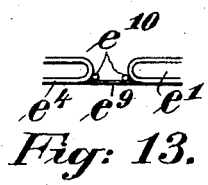
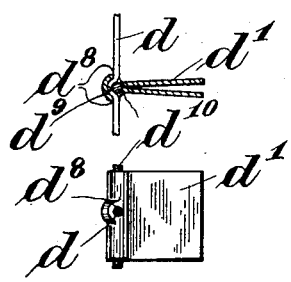
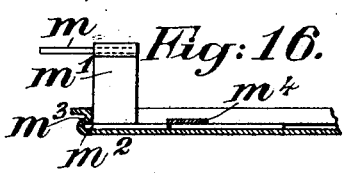
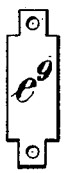
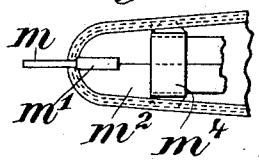
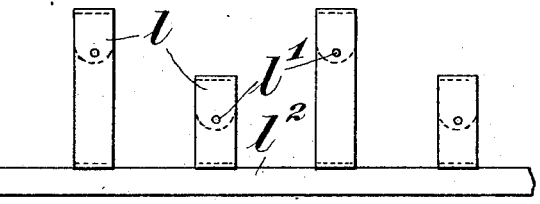
WITNESSES
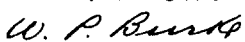
INVENTOR
Claude William Atkinson
BY
Att'y

UNITED STATES PATENT OFFICE.

CLAUDE WILLIAM ATKINSON, OF GREAT MISSENDEN, ENGLAND.

PIANO-PLAYING MECHANISM AND THE LIKE.

1,046,369.  Specification of Letters Patent. Patented Dec. 3, 1912.

Application filed April 9, 1910. Serial No. 554,346.

*To all whom it may concern:*

Be it known that I, CLAUDE WILLIAM ATKINSON, a subject of the King of Great Britain and Ireland, residing at Little Hampden, Great Missenden, in the county of Bucks, England, have invented new and useful Improvements in and Relating to Piano-Playing Mechanism and the Like, of which the following is a specification.

This invention relates to piano playing mechanism and the like, and has for its object the construction and arrangement of pneumatic operating mechanism whereby (1) simplicity, low cost of manufacture and compactness of installation are obtained. (2) metal or other impervious material can be used in place of wood.

This invention has particular reference to the piano playing mechanism described and illustrated in the complete specification filed in support of an application for Letters Patent under No. 538009 dated the 14th of January 1910.

The invention consists in the various constructional details hereinafter described and illustrated in the accompanying drawings.

Figure 1 is a sectional elevation of the key bed of an ordinary piano with my improved construction installed beneath the same and having connecting means between the power pneumatics and the key levers. Fig. 2 is a perspective view of the vacuum chest of stepped formation, and air trunks leading from the same to the orifices communicating with the playing table. Fig. 3 is a detail plan view of the end and front air trunks, showing the means of connection one to the other. Fig. 4 is a sectional view of the front air trunk taken on the line 4—4 of Fig. 3. Fig. 5 shows a part side elevation of an end trunk, showing the socket on which the front air trunks are mounted. Fig. 6 shows a side view of one of the strutting devices within the stepped vacuum chamber, for supporting the walls of the same, and affording fastening means for the power pneumatics. Fig. 7 is a part front elevation of the two front air trunks, showing the connecting means by which communication is made with the playing table. Fig. 8 is a plan of the same. Fig. 9 is a part sectional elevation of a power pneumatic, attached to its cantaliver carrying tube. Fig. 10 shows the first step of the method of assembling and fastening the power pneumatics upon the vacuum chest. Fig. 11 is a similar view of the fastening means screwed down into place so as to permanently fasten the power pneumatics. Fig. 12 is a part plan of Fig. 11. Figs. 13 and 14 show the device for making the end joint between the top of the vacuum chest and the tube of the end pneumatic. Fig. 15 is a perspective view of one of the springs for maintaining the waist in the envelop of the power pneumatic. Figs. 16 and 17 are views showing the means by which the key operating attachment is fixedly mounted on the power pneumatic. Fig. 18 shows two views of the connecting rod between the power pneumatic and its key. Fig. 19 are detail views of the pallet, at the bottom of the key connecting rod. Fig. 20 is an enlarged sectional view of the valve pneumatic and the valves which it operates. Fig. 21 is a plan view of the connecting device between a valve pneumatic and its valves. Fig. 22 is a plan view of the supports for the stems on which the valves slide.

In the drawings $a$ is the key bed of the piano, $b$ a white key, $c$ a black key and $d$ the connecting means, adapted to operate each key from the power pneumatics $e$. The power pneumatics $e$ are constructed in accordance with the description in the specification of No. 538009 of 1910.

The vacuum chest $f$ is supported at the rear of the key bed $a$ by slotted quadrants $g$, mounted on the frame of the piano and adapted to allow the whole of the player mechanism to be folded downward about the center $g^1$. The vacuum chest $f$ is made of sheet metal in two parts $f^1$ and $f^2$, bent up in the particular form shown in the drawings.

Within the body of the vacuum chest $f$ are arranged at intervals struts $h$ adapted to support the part $f^2$ wholly and to assist in supporting the ledges $f^3$ and $f^4$ of the portion $f^1$. These struts further form a part of the detachable means for holding the pneumatics in position as hereinafter described.

The power pneumatics $e$ are mounted on and attached to the tubes $e^1$ by means of hollow projection $e^2$, edges of which are bent over in order to form a riveted attachment between the tubes $e^1$ and the lower plate of the power pneumatic. The tubes $e^1$ are of flat section and are made of a sheet of metal bent around so that the two edges butt against one another closely at $e^3$, and in order to fill any small interstice left between the two abutting edges, a coating of cementing material such as red lead paint can be applied to the joint of the tube $e^1$ and the ends of the tubes are plugged by dished elements $e^{12}$.

In asembling the power pneumatics $e$ with their tubes $e^1$ in position upon the stepped surfaces of the vacuum chest $f$, they are laid side by side in series, say of 7 white notes or 5 black notes, the latter being represented in Figs. 10, 11 and 12. Between the tubes $e^1$ are disposed distance pieces $e^4$ of suitable shape, and varying in width to suit the intervals of space, and about the series of tubes and distance pieces a band $e^5$ consisting of two pieces of metal is disposed, the whole being of a curved formation of which the ends are higher than the center so that the tubes $e^1$ with their distance pieces $e^4$ form the compression member, while the band $e^5$ forms the tension member. Above the band $e^5$ is disposed a tightening bar $e^6$ which is also curved somewhat similarly to the initial formation of the tubes and distance pieces. This bar $e^6$ first bears upon the band $e^5$ and is adapted to be drawn down by screws $e^7$ which engage the ends of the bar $e^6$ and are screwed into the tapped holes $e^8$ of the struts $h$. Fig. 10 shows the whole of the parts assembled and before the tightening process is carried out.

As the screws $e^7$ are screwed down the bar $e^6$ is straightened and this in turn straightens the series of tubes $e^1$ and distance pieces $e^4$ until they assume the position shown in Fig. 11, where they lie in a straight line rigidly clamped down upon the vacuum chest and tightly drawn up together as a compact body by the action of the curved tightening bar $e^6$ on the initially curved series of tubes and distance pieces. I usually insert a thin strip $f^5$ of suitable jointing material along the top of the vacuum chest $f$ so as to insure an air tight joint. It will thus be seen that the spaces $f^6$ between the upper portions of the parts $f^1$ and $f^2$ forming the vacuum chest are entirely covered over by the series of tubes $e^1$ and distance pieces $e^4$ from end to end with the exception of where the sections of tubes $e^1$ and distance pieces $e^4$ are adjacent to one another, in which case a cover plate $e^9$ is adapted to bridge the space left between the sections of tubes and distance pieces and to be held down by the end distance pieces or end tubes of each series as the case may be; a further filling in being effected by means of packing $e^{10}$ forced in between the plate $e^9$ and curved portion of the tubes $e^1$ or distance pieces $e^4$ as the case is (illustrated in Fig. 13); the packing being maintained in place by shellac varnish or other suitable medium.

In order to maintain a waist in the flexible envelop of the power pneumatics so that the said envelop properly folds when the power pneumatic is operated, a spring $i$ of thin wire is arranged in the shape shown in Fig. 15, so that the looped portion $i^1$ rests upon the top of the tube $e^1$ while the extending prongs $i^2$ are disposed along the fold of the power pneumatic $e$ and exert a pressure inward so as to give the flexible envelop a tendency to fold inward; this spring $i$ is held in position by any suitable means such as a binding thread $i^3$.

Within the power pneumatic $e$ at the end where the two parts hinge on one another, a pad $e^{11}$ of felt or other flexible or resilient material is disposed so as to insure a better hinged connection and relieve to a certain extent the flexible envelop at the hinge from undue strain.

The valve pneumatics $k$ are of similar construction to those described in the beforementioned specification and are inserted into conical seats $k^1$ formed in the bottom wall of the vacuum chest. To the part $k^{12}$ is attached a flexible envelop $k^{13}$ to which in turn is attached a dished body $k^{14}$, a groove $k^{15}$ being provided around the said body into which the envelop $k^{13}$ is bound by thread. The stem $k^2$ is attached to the part $k^{14}$ and is provided at its upper end with a platform $k^3$ adapted to contact with the bridle $k^4$ slidingly mounted on the stem $k^5$ and adapted to lift the valve $k^6$ directly, and by means of the sliding sleeve $k^7$ and spring $k^8$ also the valve $k^9$. The valves $k^6$ and $k^9$ when the part $k^{14}$ is lifted by the collapsing action of the atmosphere operate in conjunction with seatings formed on both sides of the tubes $e^1$.

In order to support the weight of the moving part, a spring $k^{10}$ is disposed on the upper surface of the valve pneumatic $k$ and engages on the underside of the platform $k^3$. Further a pad $f^7$ of felt or other similar resilient material is disposed beneath the valve pneumatics and supported by a tray $f^8$ of metal or the like, so arranged as to afford protection to the said valve pneumatics and to act as a support when the player is out of action (see Fig. 1). In order that the bridle can pass over the head of the stem $k^5$ when being assembled a kink $k^{11}$ is made in the bridle as shown in Fig. 21.

A suitable support is provided for each of the stems $k^5$ by a series of U-shaped arms $l$ being bent up from a single strip of metal (as shown in Figs. 1, 12 and 22) having holes $l^1$ through two thicknesses of metal and into the holes $l^1$ the stems $k^5$ are adapted to be held in a rigid manner.

It will be noticed in Figs. 10 and 11 that a strip of metal is shown inside the band $e^5$, this is essentially the common bar $l^2$, upon which the various supporting devices are mounted or attached. It has been found in practice that there is no need for a bleed hole to be provided in the valve pneumatics $k$ as the hole through the upper part of the valve pneumatic through which the stem $k^2$ passes can be made sufficiently large to act as a bleed hole.

On the top plate of the power pneumatics $e$, I provide pins $m$, carried in brackets $m^1$, each bracket having a foot $m^2$, which is adapted to engage under the ridge $m^3$ of the power pneumatic. A retaining plate $m^4$ of wedge formation rests upon the upper side of the foot $m^2$ of the bracket $m^1$, and by engaging the ridge $m^3$ of the power pneumatic $e$ on each side exerts a jamming action on the foot of the bracket $m^1$. This bracket $m^1$ is made of one piece of metal bent around to form a boss for holding the pin $m$. The pin $m$, when the mechanism is properly assembled is disposed above the top of the projecting arm $d^1$, rigidly held at the lower end of the connecting rod $d$ which at its upper end is provided with a clip $d^2$ adapted to engage with a lateral projection $d^3$ attached to the underside of the key; this form of connection allows the whole of the piano action to be moved across the piano to a certain extent as is the case when the soft pedal is used in grand pianos, without putting any strain on the key attachment $d$.

The various key connectors are guided in felt bushes $d^4$, suitably held in metal tubes $d^5$, supported in the key bed $a$, while on the underside of the key bed $a$, leather disks $d^6$ are provided and maintained in place by metal washers $d^7$. The leather disks serve as guiding supports to the lower part of the connecting rods $d$. The projecting arms $d^1$ are fastened to the rods $d$ by forming them of plate bent double with an eye at the part where the bend is situated and having two holes $d^8$ through which the stem $d$ can pass; the stem $d$ being provided with a kink $d^9$ so as to lie at the back of the eye and be maintained in a fixed position by a pin $d^{10}$ driven laterally through the eye.

Referring now to Fig. 2 the vacuum chest $f$ is connected at its end with side trunks $n$, which at the front portion of the mechanism are connected to a long trunk $n^1$, arranged from side to side and two short trunks $n^2$, which extend up to the front plate $n^3$ to which the playing table is attached. It will be noticed that the trunks $n^1$ and $n^2$ are arranged with their long axes at right angles to one another, in order to form a girder of great constructural rigidity on the one hand and a proper transverse sectional area of passage on the other. The air trunk connections $n^4$ to the playing table, are disposed on the front face of the combined trunks $n^1$ and $n^2$, and in order to form a simple and effective connection between the trunks $n$ and $n^1$ and $n^2$ I provide as shown in Figs. 3, 4 and 5 a raised shoulder $n^5$ on the trunk $n$, over which the trunks $n^1$ and $n^2$ pass as a sleeve; blocks $n^6$ are inserted and held in the trunks $n^1$ and $n^2$ into which screwed studs $n^7$ provided with nuts $n^8$ are inserted so as to draw the trunks $n^1$ and $n^2$ respectively, into close proximity to the trunk $n$. Dished caps $n^9$ are attached to the ends of the trunks $n$ in order to close the same. The trunk $n^1$ is divided at its central part by stop pieces $n^{10}$ (see Fig. 7) which not only divide the trunk into bass and treble sections but at the same time enable the riveted connections between the two trunks $n^1$ and $n^2$ to be made in a substantial manner. The ends of the tracker pipes are inserted into rearwardly dished holes stamped in the front perforated plate $n^3$, to form a flange and are locked in position by being expanded into the holes formed by the flanged portion. The plate $n^3$ is extended backward and laterally to form a base plate for the whole mechanism.

In order that the mechanism can be partly dismounted for inspection or repair I provide a pivotal device $g$ at the rear of the apparatus and at the front along the underside of the key bed $a$ I arrange a strip $o$ of metal or similar material from which depend lugs $o^1$ formed with an inclined plane on their rearmost side as shown in Fig. 1, so that the lugs $o^1$ shall not interfere with the passage of the top front edge of the trunk $n^1$ when the player is rotated about its center $g^1$. When the player is to be maintained in position a wedge $o^2$ is inserted between the rear side of the lug $o^1$ and the front of the playing mechanism and held in place by a screw $o^3$, the said screw serving also to lock the player in position; the block $o^5$ which acts as the nut also closing the end of the trunk $n^2$. Spring pressed hooks $o^4$ are also provided as a means of attachment for the playing table, the said hooks being mounted in slots formed in the lugs $o^1$.

Claims.

1. In a piano playing mechanism of the type described, in combination, a vacuum chest having upper surfaces in different horizontal planes, a supporting pipe having one end mounted on one of the said horizontal surfaces of the said chest, a power pneumatic mounted on the other end of the said pipe, and hollow projections having bent edges rigidly connecting the power pneumatic to its supporting pipe adapted to form air passages from said pipe to the said pneumatic, substantially as described.

2. In a piano playing mechanism of the type described, the combination of a stepped vacuum chest with a series of sections of power pneumatics, each section comprising a certain number of power pneumatics mounted on tubes ranged side by side, folded metal distance pieces between said tubes where necessary, a tension band surrounding the assembled parts adapted to give before clamping down an arched formation to the said section, inversely curved clamping bars disposed along the length of the section, means engaging with the vacuum chest for drawing the bars down tightly on the section to take the curve out of both section and bars and put the tubes and distance pieces into compression and tightly bed said section on the vacuum chest, a pair of valves mounted on a loose pin, a distance piece disposed between said valves, and a support mounted on and held firm by the power pneumatic fastening devices for supporting the said loose pin, substantially as described.

3. In a piano playing mechanism of the type described, the combination of a stepped vacuum chest with a series of sections of power pneumatics, each section comprising a certain number of power pneumatics mounted on tubes ranged side by side, folded metal distance pieces between said tubes where necessary, a tension band surrounding the assembled parts adapted to give before clamping down an arched formation to the said section, inversely curved clamping bars disposed along the length of the section, means engaging with the vacuum chest for drawing the bars down tightly on the section to take the curve out of both section and bars and put the tubes and distance pieces into compression and tightly bed said section of the vacuum chest, a pair of valves mounted on a loose pin, a distance piece disposed between said valves, a support mounted on and held firm by the power pneumatic fastening devices for supporting the said loose pin, and a valve pneumatic having a platform on its stem adapted to engage a striker threaded on said pin adapted to operate the said valves, substantially as described.

4. In a piano playing mechanism of the type described, the combination of a stepped vacuum chest and a power pneumatic mounted thereon and provided with a movable top plate having tapering sides with upwardly and inwardly turned edges with a key actuating device on each power pneumatic consisting of a base plate carrying the said key actuating device, said plate engaging under the overlying edges of the top plate of the power pneumatic, and a retaining plate disposed over said base plate and jammed between the tapering side edges of the said power pneumatic plate to hold both the key actuating device and itself in a fixed position, substantially as described.

In testimony whereof I have signed my name to this specification in the presence of two subscribing witnesses.

CLAUDE WILLIAM ATKINSON.

Witnesses:
REGINALD WILLIAM JAMES,
CHARLES J. R. BULLOUGH.

---

Copies of this patent may be obtained for five cents each, by addressing the "Commissioner of Patents, Washington, D. C."